United States Patent
Haimer

(10) Patent No.: US 10,646,928 B2
(45) Date of Patent: May 12, 2020

(54) SCREWING TOOL, TOOL HOLDER, AND TOOL ASSEMBLY INCLUDING THE SCREWING TOOL AND THE TOOL HOLDER

(71) Applicant: Franz Haimer Maschinenbau KG, Igenhausen (DE)

(72) Inventor: Franz Haimer, Igenhausen (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 0 days.

(21) Appl. No.: 15/744,875

(22) PCT Filed: Jul. 13, 2016

(86) PCT No.: PCT/EP2016/066660
§ 371 (c)(1),
(2) Date: Jan. 15, 2018

(87) PCT Pub. No.: WO2017/016877
PCT Pub. Date: Feb. 2, 2017

(65) Prior Publication Data
US 2018/0200804 A1 Jul. 19, 2018

(30) Foreign Application Priority Data
Jul. 24, 2015 (DE) .................. 10 2015 112 079

(51) Int. Cl.
*B23B 31/11* (2006.01)
*B23B 31/00* (2006.01)
*B23C 5/10* (2006.01)

(52) U.S. Cl.
CPC ........ *B23B 31/1122* (2013.01); *B23B 31/005* (2013.01); *B23C 5/10* (2013.01);
(Continued)

(58) Field of Classification Search
CPC ............... B23B 31/005; B23B 31/1122; B23B 2231/0204; B23B 2251/02;
(Continued)

(56) References Cited

U.S. PATENT DOCUMENTS 3,047,316 A * 7/1962 Wehring ............... E21B 17/042
285/334
5,114,286 A * 5/1992 Calkins ................. B23B 31/11
408/226
(Continued)

FOREIGN PATENT DOCUMENTS

| DE | 102012100976 A1 | 8/2013 |
| WO | 91/14073 A1 | 9/1991 |
| WO | 2010047158 A1 | 4/2010 |

OTHER PUBLICATIONS

English translation of International Preliminary Report dated Jan. 30, 2018 for PCT/EP2016/066660 filed Jul. 13, 2016.
(Continued)

*Primary Examiner* — Sunil K Singh
*Assistant Examiner* — Paul M Janeski
(74) *Attorney, Agent, or Firm* — Paul D. Bianco; Katharine Davis; Fleit Intellectual Property Law

(57) ABSTRACT

A screwing tool includes a tool head and a tool shaft having an external thread. A first support section is disposed between the tool head and the external thread, and a second support section is disposed between the external thread and a free end of the tool shaft. The second support section has radially outwardly projecting supporting elements that are disposed at a distance from each other in the circumferential direction.

27 Claims, 3 Drawing Sheets

(52) U.S. Cl.
CPC ... *B23B 2231/0204* (2013.01); *B23B 2250/16* (2013.01); *B23B 2265/08* (2013.01); *B23B 2270/12* (2013.01); *B23C 2210/02* (2013.01); *B23C 2240/32* (2013.01)

(58) Field of Classification Search
CPC ............ B23B 2250/16; B23B 2265/08; B23B 2270/12; B23C 5/10; B23C 2210/02; B23C 2240/32; Y10T 279/15; Y10T 279/16
See application file for complete search history.

(56) References Cited

U.S. PATENT DOCUMENTS

| | | | | |
|---|---|---|---|---|
| 5,971,670 | A * | 10/1999 | Pantzar | B23B 31/1107 407/119 |
| 7,004,692 | B2 * | 2/2006 | Hecht | B23B 31/008 279/8 |
| 7,611,311 | B2 * | 11/2009 | Kakai | B23B 31/1107 279/8 |
| 8,662,800 | B2 * | 3/2014 | Guay | B23C 5/10 279/8 |
| 2007/0248421 | A1 * | 10/2007 | Kakai | B23B 31/1107 407/34 |
| 2008/0304923 | A1 * | 12/2008 | Lehto | B23B 31/005 407/100 |
| 2015/0202690 | A1 * | 7/2015 | Haimer | B23B 31/1115 279/99 |

OTHER PUBLICATIONS

English translation of Written Opinion for PCT/EP2016/066660 filed Jul. 13, 2016.
International Search Report dated Nov. 10, 2016 for PCT/EP2016/066660 filed Jul. 13, 2016.
Written Opinion for PCT/EP2016/066660 filed Jul. 13, 2016.
Result of search report for German Patent Application No. 10 2015 112 079.8 filed Jul. 24, 2015.

* cited by examiner

SCREWING TOOL, TOOL HOLDER, AND TOOL ASSEMBLY INCLUDING THE SCREWING TOOL AND THE TOOL HOLDER

FIELD OF THE INVENTION

The present invention relates to a screwing tool, a tool holder and a tool assembly.

BACKGROUND OF THE INVENTION

DE 10 2012 100 976 A1 describes a prior-art generic screwing tool with a tool holder. The screwing tool comprises a tool head, on which cutting edges for metal cutting machining operations are disposed, and a tool shaft having an external thread for connection to the tool holder. In addition, the tool shaft has a first support section between the tool head and the external thread and a second support section disposed adjoining a free end of the tool shaft. Complementary thereto, the tool holder has a receiving opening having an internal thread and a first mounting section disposed between a front face side of the tool holder and the internal thread as well as a second mounting section disposed on an inside end of the receiving opening. The first support section of the screwing tool and the first mounting section of the tool holder as well as the second support section of the screwing tool and the second mounting section of the tool holder are in contact with each other and thereby ensure that the screwing tool is especially effectively supported and centered in the tool holder.

Because of the extremely hard and brittle material, this type of screwing tool invariably runs the risk of breakage, in particular if an excessively high screwing torque is applied when the screwing tool is being installed in the tool holder. It is therefore especially important to ensure that the torque required can be determined as accurately as possible.

SUMMARY OF THE INVENTION

One aspect of the present invention is a screwing tool and a tool holder, which allows them to be securely installed.

A screwing tool, a tool holder and a tool assembly are disclosed herein. Useful embodiments of the present invention are also disclosed.

One special feature of the screwing tool disclosed in the present invention is that the second support section comprises radially outwardly projecting supporting elements that are disposed at a distance from each other in the circumferential direction. These supporting elements have the effect of reducing friction losses due to smaller contact surfaces, which in turn also reduces the torque that is required for installing the screwing tool in the tool holder and that results from the reciprocal contact in the second support section. As a result, the overall torque to be applied corresponds even more closely to the optimum torque calculated for the screw engagement so that excessive stress on the screwing tool can be prevented. In addition, the supporting elements that are disposed a distance from each other cause the vibrations to be more effectively damped due to the higher elasticity of the individual outwardly projecting supporting elements. The damping properties can also be specifically influenced by way of the size and number of the contact surfaces.

In a useful embodiment, the supporting elements are disposed at an equal distance from each other in the circumferential direction. It is, however, also possible to dispose the supporting elements at an unequal distance from each other, but centrosymmetrically with respect to the center line of the screwing tool.

To ensure an especially effective support, the supporting elements can be configured in the form of raised strips that extend in the axial direction of the screwing tool.

In the radially most outward section, the supporting elements can also have a contact surface in the shape of a cylindrical segment, which is preferably configured coaxially with respect to a longitudinal axis of the screwing tool. The contact surfaces in the shape of cylindrical segments allow full-surface contact between the supporting elements and the tool holder and thus ensure stable centering. However, to further reduce friction between the supporting elements and the tool holder, cambered contact surfaces or contact surfaces in the shape of a spherical segment can also be disposed on the supporting elements, the enveloping surface of which contact surfaces is formed using a sphere, the center of which is disposed either on, or radially at a distance from, the center line of the screwing tool. This results, respectively, in a contact point or line between the supporting elements and the tool holder having correspondingly reduced frictional forces.

To facilitate insertion of the supporting elements of the screwing tool into a complementary mounting section of the tool holder and to ensure a uniform elastic deformation of the supporting elements, the supporting elements can have an insertion chamfer on a side facing the free end of the tool shaft.

To stabilize the supporting elements especially during the installation of the screwing tool in the tool holder, transitions between the supporting elements and recesses, which are disposed in the circumferential direction between the supporting elements, can be rounded so as to have smaller outside dimensions.

To ensure that the screwing tool is mounted especially stably and optimally centered in the tool holder, the first support section can be formed using two conical contact surfaces having different angles of taper, which contact surfaces are preferably in contact with each other. Optimum centering can be achieved by tapering both the first conical contact surface and the second conical contact surface in the screwing direction of the screwing tool. Especially in this type of biconical mounting configuration, the screwing torque, because of the absence of a stop surface at right angles relative to the screwing force, must be set especially precisely since the tool holder will otherwise be deformed as the screwing tool is increasingly screwed in.

In addition, the present invention claims a tool holder for a screwing tool. The special feature of this tool holder is that the second mounting section comprises radially inwardly projecting mounting elements that are disposed at a distance from each other. Because of the smaller contact surfaces, these mounting elements have the effect of reducing friction losses, which in turn also reduces the torque required for installing the screwing tool in the tool holder, which torque results from the reciprocal contact in the second support section. As a result, the overall torque to be applied corresponds even more closely to the optimum torque calculated for the screw engagement so that excessive stress on the screwing tool can be prevented. In addition, the mounting elements, which are disposed at a distance from each other, cause the vibrations to be more effectively damped due to the higher elasticity of the individual outwardly projecting mounting elements. The damping properties can also be specifically influenced by the size and number of the contact surfaces.

In a useful embodiment, the mounting elements are disposed at an equal distance from each other in the circumferential direction. It is, however, also possible to dispose the mounting elements at an unequal distance from each other, but centrosymmetrically with respect to the center line of the tool holder.

To ensure an especially effective support, the mounting elements can be configured in the form of raised strips that extend in the axial direction of the tool holder.

In the radially most inward section, the mounting elements can also have a mounting surface in the shape of a cylindrical segment, which is preferably configured coaxially with respect to a longitudinal axis of the tool holder. The mounting surfaces in the shape of cylindrical segments allow full-surface contact between the mounting elements and the screwing tool and thus ensure stable centering of the screwing tool. However, to further reduce friction between the mounting elements and the screwing tool, cambered mounting surfaces or mounting surfaces in the shape of a spherical segment or rotationally symmetrical mounting surfaces that are curved in the cross-section can also be disposed on the mounting elements. This results, respectively, in a contact point or line between the mounting elements and the screwing tool having correspondingly reduced frictional forces.

To facilitate insertion, for example, of a cylindrical mounting section on the screwing tool into the second mounting section and to ensure a uniform elastic deformation of the mounting elements, the mounting elements can have a centering chamfer on a side facing the internal thread of the tool holder.

To stabilize the mounting elements especially during the installation of the screwing tool in the tool holder, transitions between the mounting elements and recesses, which are disposed in the circumferential direction between the mounting elements, can be rounded so as to have smaller outside dimensions.

To ensure that the screwing tool is mounted especially stably and optimally centered in the tool holder, the first mounting section can be formed using two conical mounting surfaces having different angles of taper, which mounting surfaces are preferably in contact with each other. Optimum centering can be achieved by tapering both the first conical mounting surface and the second conical mounting surface in the screwing direction of the screwing tool. Especially in this type of biconical mounting configuration, the screwing torque, because of the absence of a stop surface at right angles relative to the screwing force, must be set especially precisely since the tool holder will otherwise be deformed as the screwing tool is increasingly screwed in.

In addition, the present invention also claims a tool assembly that is characterized in that the screwing tool and/or the tool holder are configured as described above.

Most preferably, both the screwing tool and the tool holder can be configured as described above, wherein the spacing between the supporting elements of the second support section of the screwing tool, which supporting elements project radially outwardly and are disposed at a distance from each other in the circumferential direction, differs from the spacing between the mounting elements of the second mounting section of the tool holder, which mounting elements project radially inwardly and are disposed at a distance from each other in the circumferential direction. This has the effect that, independent of the angular position between the screwing tool and the tool holder when screwed together, at least some of the supporting elements and mounting elements are in contact with each other.

However, it is also possible for the spacing between the supporting elements and the spacing between the mounting elements to be identical, in which case these elements are to be disposed on the tool holder and on the screwing tool in such a manner that, when screwed together, the supporting elements and the mounting elements are radially opposite to, and in contact with, each other.

The contact surfaces preferably have the same height. However, if the opposite surfaces coincide, these contact surfaces can also have different heights.

BRIEF DESCRIPTION OF THE DRAWINGS

Additional characteristic features and advantages of the invention follow from the description of preferred practical examples below with reference to the drawings. The drawings show.

DETAILED DESCRIPTION OF THE INVENTION

Figure 1:
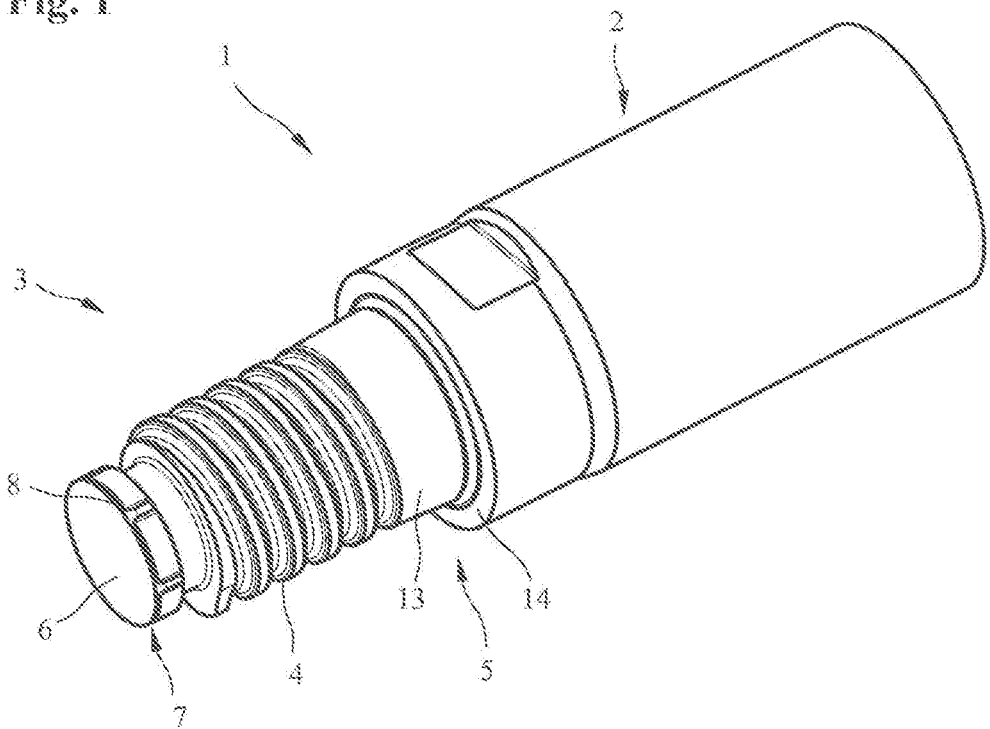
FIG. 1 a perspective representation of a screwing tool, comprising a tool head and a tool shaft.

FIG. 1 shows a screwing tool 1 having a tool head 2 and a tool shaft 3. Disposed on the tool head 2 are blades (not shown) for machining a workpiece. The tool shaft 3 comprises an external thread 4, a first support section 5 disposed between the tool head 2 and the external thread 4 and a second support section 7 disposed between a free end 6 of the tool shaft 3 and the external thread 4. The free end 6 is formed using a front face side of the tool shaft 3.

The second support section 7 comprises outwardly projecting supporting elements 8 that are disposed at a distance from each other in the circumferential direction. The configuration of these supporting elements 8 will be described in greater detail with reference to FIG. 2.

Figure 2:
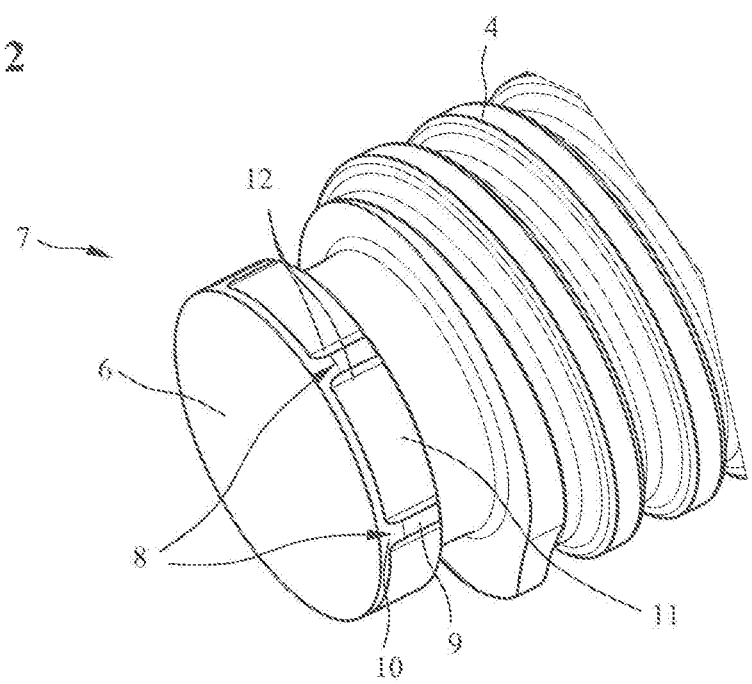
FIG. 2 a detail view of a support section of the screwing tool of FIG. 1.

FIG. 2 shows the second support section 7 of the screwing tool 1 of FIG. 1 in greater detail. As this figure indicates, the supporting elements 8 are configured in the form of raised strips that extend in the axial direction of the screwing tool 1 and that are disposed at an equal distance from each other. In the radially most outward section, the supporting elements 8 each have contact surfaces 9 in the shape of a cylindrical segment that serve to form a centering and damping contact with a tool holder (not shown). The contact surfaces 9 in the shape of cylindrical segments are configured coaxially with respect to a longitudinal axis of the screwing tool 1 so that the contact surfaces 9 together form a common cylindrical enveloping surface that is concentric with the longitudinal axis of the screwing tool 1.

To facilitate insertion of the screwing tool 1 into a complementary mounting location in a tool holder and to ensure a uniform elastic, radially inwardly directed deformation of the supporting elements 8, the supporting elements 8 have an insertion chamfer 10 on a side facing the free end 6.

Disposed in the circumferential direction between the supporting elements 8 are recesses 11, the outside dimensions of which are radially smaller than those of the supporting elements 8, i.e., the recesses 11 are radially offset inwardly relative to the supporting elements 8. These recesses 11 ensure that the screwing tool 1 and the tool holder 15 (not shown in FIG. 2) are not in continuous contact with each other over the entire circumference, but make only intermittent contact in the area of the supporting elements 8, so that the friction is reduced by means of the decreased surface contact.

The transitions 12 between the supporting elements 8 and the recesses 11 are rounded so as to ensure that forces, in particular circumferential forces, introduced into the tool shaft 3 act especially effectively on the supporting elements 8.

In addition, FIG. 1 shows that the first support section 5 is formed using two conical contact surfaces 13, 14 that are in direct contact with each other. The diameters of the first conical contact surface 13 and the second conical contact surface 14 taper in the screwing direction of the screwing tool 1. Particulars relating thereto are explained in greater detail in DE 10 2012 100 976 A1, the contents of which are herein fully incorporated by way of reference.

Figure 3:
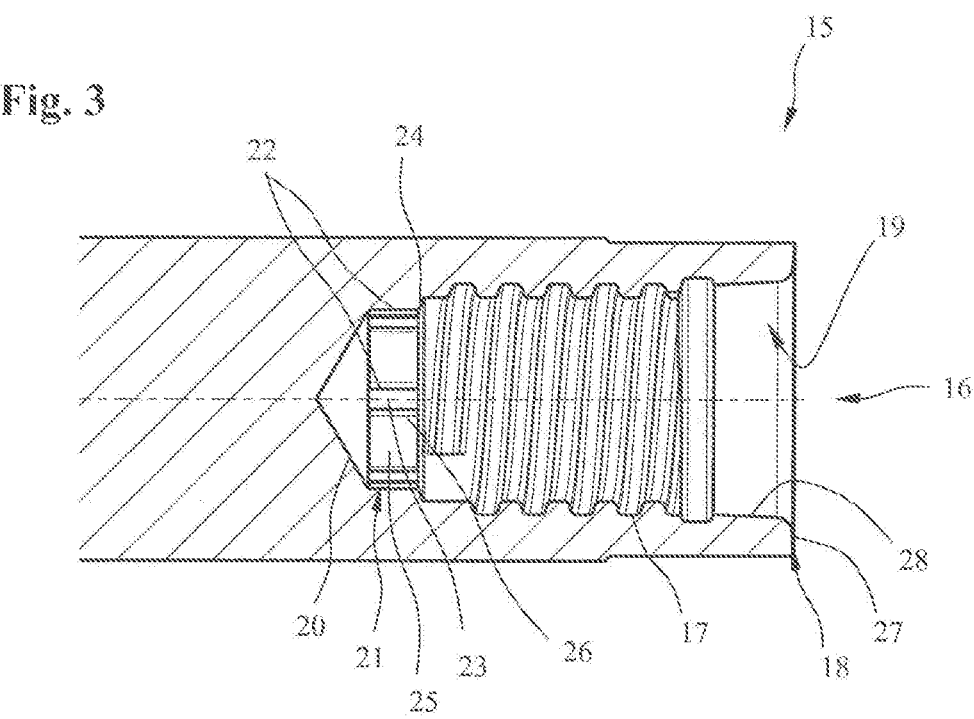
FIG. 3 a sectional view of a front section of a tool holder having a receiving opening for a screwing tool.

FIG. 3 shows a sectional view of a front section of a tool holder 15 that is configured to receive the screwing tool 1 described. The tool holder 15 has a receiving opening 16 having an internal thread 17. Disposed between a front face side 18 of the tool holder 15 facing the screwing tool 1 (not shown in FIG. 3) and the internal thread 17 is a first mounting section 19. In addition, disposed on an inside end 20 of the receiving opening 16 is a second inside mounting section 21 that comprises radially inwardly projecting mounting elements 22 that are disposed at a distance from each other.

As FIG. 3 indicates, the mounting elements 22 are disposed at an equal distance from each other in the circumferential direction and configured in the form of raised strips that extend in the axial direction of the tool holder 15. In a radially most inward section, the mounting elements 22 each have a mounting surface 23 in the shape of a cylindrical segment that extends coaxially with respect to a longitudinal axis of the tool holder 15 and serves to form a centering and damping contact with the screwing tool 1 (not shown).

To facilitate insertion of the screwing tool 1 and a uniform elastic deformation of the mounting elements 22, the mounting elements 22 have a centering chamfer 24 on a side facing the internal thread 17. In addition, disposed in the circumferential direction between the mounting elements 22 are recesses 25, the outside dimensions of which are larger than those of the mounting elements 22, i.e., the recesses 25 are radially offset outwardly relative to the mounting elements 22. These recesses 25 ensure that the tool holder 15 and the screwing tool 1 (not shown in FIG. 3) are not in continuous contact with each other over the entire circumference, but make only intermittent contact in the area of the mounting elements 22, so that the friction is reduced because of the decreased surface contact.

The transitions 26 between the mounting elements 22 and the recesses 25 are rounded so as to ensure that forces, in particular circumferential forces, introduced into the tool holder 15 act especially effectively on the mounting elements 22.

The first mounting section 19 is formed using two conical mounting surfaces 27, 28 having different angles of taper, which mounting surfaces are in direct contact with each other. The diameters of the first conical mounting surface 27 and of the second conical mounting surface 28 taper in the direction in which the screwing tool 1 (not shown) is screwed into the tool holder 15, i.e., in FIG. 3, toward the left. Particulars relating thereto are explained in greater detail in DE 10 2012 100 976 A1, the contents of which are herein fully incorporated by reference.

Figure 4:
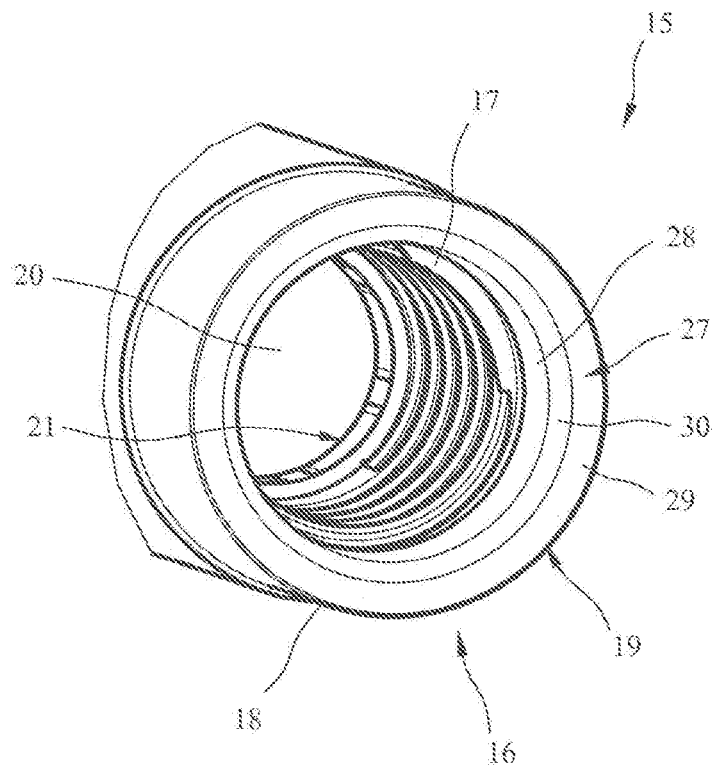
FIG. 4 a perspective view of the receiving opening of the tool holder of FIG. 3 and FIG. 5 a detail view of a mounting section of the tool holder of FIG. 4.

FIG. 4 shows a perspective view of the receiving opening 16 of the tool holder 15. As the figure indicates, the first mounting section 19 is disposed on the front face side 18 of the tool holder 15 and comprises the first conical mounting surface 27 and the second conical mounting surface 28. On the end facing the second conical mounting surface 28, the first conical mounting surface 27, in addition to a cone-shaped segment 29, has a rounded profile 30 as a transition to the second conical mounting surface 28. The front face side 18 is formed by a circumferential edge.

In the inside end 20 of the receiving opening 16 following the internal thread 17, the second mounting section 21 is disposed. This mounting section is shown in the detail view of FIG. 5. As indicated in the figure, the second mounting section 21 comprises the inwardly projecting mounting elements 22 that in the circumferential direction are adjoined on both sides by the transitions 26 and subsequently by the recesses 25. In addition, the centering chamfer 24 is configured on the side of the mounting elements 22 that faces the internal thread 17.

Figure 5:
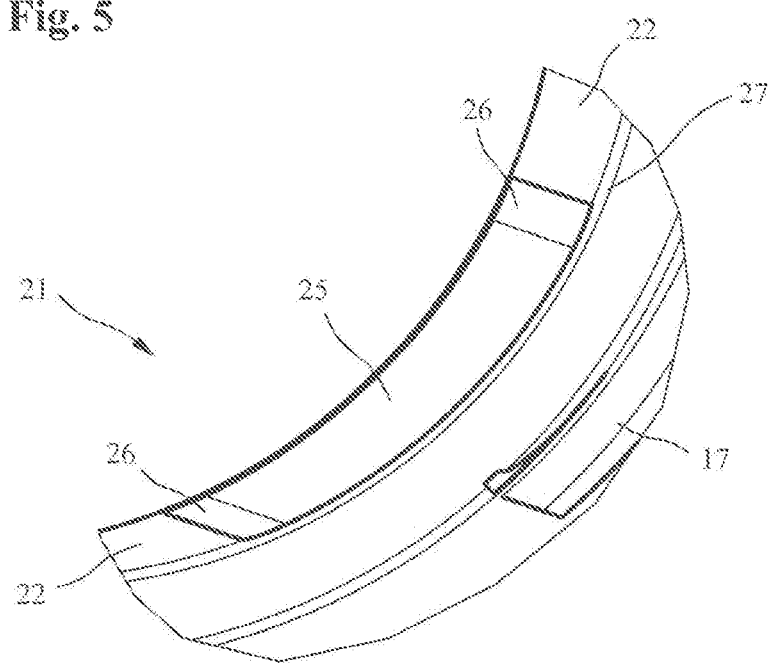

The screwing tool 1 shown in FIGS. 1 and 2 and the tool holder 15 shown in FIGS. 3 to 5 together form a tool assembly, i.e., the external thread 4 and the internal thread 17, the first support section 5 having the conical contact surfaces 13, 14, and the first mounting section 19 having the conical mounting surfaces 27, 28 as well as the second support section 7 having the supporting elements 8 and the second mounting section 21 having the mounting elements 22 are configured so as to contact each other. The spacing between the radially outwardly projecting supporting elements 8 that are disposed at an equal distance from each other, i.e., the number of the supporting elements disposed along the entire circumference, can differ from the spacing between the radially inwardly projecting mounting elements 22 that are disposed at an equal distance from each other, thereby ensuring contact between said elements.

However, it is also possible to configure the second support section 7 or the second mounting section 21 in the manner described above only on the screwing tool 1 or on the tool holder 15, respectively, and to correspondingly configure the opposite section of the tool holder 15 or of the screwing tool 1, respectively, so as to have a cylindrical or conical rotationally symmetrical profile.

LIST OF REFERENCE NUMBERS

1 Screwing tool
2 Tool head
3 Tool shaft
4 External thread
5 First support section
6 Free end of the tool shaft
7 Second support section
8 Supporting elements
9 Contact surface
10 Insertion chamfer
11 Recesses
12 Transition between the supporting elements and the recesses
13 First conical contact surface
14 Second conical contact surface
15 Tool holder
16 Receiving opening
17 Internal thread 18 Front face of the tool holder
19 First mounting section
20 Inside end of the receiving opening
21 Second mounting section
22 Mounting elements
23 Mounting surface in the shape of a cylindrical segment
24 Centering chamfer
25 Recesses
26 Transition between the mounting elements and the recess
27 First conical mounting surface
28 Second conical mounting surface
29 Cone-shaped segment 29
30 Rounded profile

The invention claimed is:

1. A screwing tool comprising a tool head and a tool shaft having an external thread, a first support section disposed between the tool head and the external thread and a second support section disposed between the external thread and a free end of the tool shaft, wherein the second support section comprises radially outwardly projecting supporting elements that are disposed at a distance from each other in a circumferential direction, each radially outwardly projecting supporting element having a contact surface shaped as a cylindrical segment, and wherein disposed in the circumferential direction between the radially outwardly projecting supporting elements are recesses having outside dimensions that are smaller than those of the radially outwardly projecting supporting elements such that each of the recesses do not extend beyond the second support section.

2. The screwing tool of claim 1, wherein the radially outwardly projecting supporting elements are disposed at an equal distance from each other or are disposed at an unequal distance from each other.

3. The screwing tool of claim 1, wherein the radially outwardly projecting supporting elements are configured in a form of raised strips that extend in an axial direction of the screwing tool.

4. The screwing tool of claim 1, wherein the contact surfaces shaped as cylindrical segments are configured coaxially with respect to a longitudinal axis of the screwing tool.

5. The screwing tool of claim 1, wherein each of the radially outwardly projecting supporting elements has a cambered contact surface.

6. The screwing tool of claim 1, wherein the radially outwardly projecting supporting elements have an insertion chamfer on a side facing the free end of the tool shaft.

7. The screwing tool of claim 1, wherein the second support section further comprises transitions between the radially outwardly projecting supporting elements and the recesses, each of the transitions having a rounded shape.

8. The screwing tool of claim 1, wherein the first support section is formed using two conical contact surfaces, each of the two conical contact surfaces having a different angle of taper.

9. The screwing tool of claim 8, wherein the two conical contact surfaces directly adjoin each other.

10. The screwing tool of claim 8, wherein the diameters of the two conical contact surfaces taper in a screwing direction of the screwing tool.

11. A tool holder configured and arranged for engagement with the screwing tool of claim 1, the tool holder comprising:

a receiving opening having an internal thread, a first mounting section disposed between a front face side of the tool holder and the internal thread and an inside second mounting section following the internal thread, wherein the inside second mounting section comprises radially inwardly projecting mounting elements that are disposed at a distance from each other and have mounting surfaces shaped as cylindrical segments, wherein disposed in a circumferential direction between the radially inwardly projecting mounting elements are recesses spaced from the internal thread, the recesses having outside dimensions that are larger than those of the radially inwardly projecting mounting elements and wherein when the screwing tool is engaged within the tool holder, the mounting surfaces shaped as cylindrical segments of the radially inwardly projecting mounting elements of the tool holder are engaged in surface contact with the contact surfaces shaped as cylindrical segments of the radially outwardly projecting supporting elements of the screwing tool.

12. The tool holder of claim 11, wherein the radially inwardly projecting mounting elements are disposed at an equal distance from each other or are disposed at an unequal distance from each other.

13. The tool holder of claim 11, wherein the radially inwardly projecting mounting elements are configured in a form of raised strips that extend in an axial direction of the tool holder.

14. The tool holder of claim 11, wherein the mounting surfaces shaped as cylindrical segments are configured coaxially with respect to a longitudinal axis of the tool holder.

15. The tool holder of claim 11, wherein each of the radially inwardly projecting mounting elements has a cambered mounting surface.

16. The tool holder of claim 11, wherein the radially inwardly projecting mounting elements have a centering chamfer on a side facing the internal thread.

17. The tool holder of claim 11, wherein the inside second support section further comprises transitions between the radially inwardly projecting mounting elements and the recesses, each of the transitions having a rounded shape.

18. The tool holder of claim 11, wherein the first mounting section is formed using two conical mounting surfaces, each of the two conical mounting surfaces having a different angle of taper.

19. The tool holder of claim 18, wherein the two conical mounting surfaces directly adjoin each other.

20. The tool holder of claim 18, wherein the diameters of the two conical mounting surfaces taper in a screwing direction of the screwing tool.

21. A tool assembly including a screwing tool and a tool holder, the tool holder configured and arranged for engagement with the screwing tool, the tool assembly comprising:

a screwing tool having a tool head and a tool shaft having an external thread, a first support section disposed between the tool head and the external thread and a second support section disposed between the external thread and a free end of the tool shaft, wherein the second support section comprises radially outwardly projecting supporting elements that are disposed at a distance from each other in a circumferential direction, each radially outwardly projecting supporting element having a contact surface shaped as a cylindrical segment, and wherein disposed in the circumferential direction between the radially outwardly projecting supporting elements are recesses having outside dimensions that are smaller than those of the radially outwardly projecting supporting elements such that each of the recesses do not extend beyond the second support section; and a tool holder including a receiving opening having an internal thread, a first mounting section disposed between a front face side of the tool holder and the internal thread and an inside second mounting section following the internal thread, wherein the second mounting section comprises radially inwardly projecting mounting elements that are disposed at a distance from each other and configured and arranged to support the tool shaft when the tool shaft is engaged within the tool holder, wherein disposed in a circumferential direction between the radially inwardly projecting mounting elements are recesses spaced from the internal thread, the recesses having outside dimensions that are larger than those of the radially inwardly projecting mounting elements and wherein each of the radially inwardly projecting mounting elements has a mounting surface shaped as a cylindrical segment configured and arranged for contacting one of the contact surfaces shaped as cylindrical segments of the radially outwardly projecting supporting elements of the screwing tool when the screwing tool is engaged in the receiving opening.

22. The tool assembly of claim 21, wherein spacing between the radially outwardly projecting supporting elements of the second support section of the screwing tool is different from spacing between the radially inwardly projecting mounting elements of the inside second mounting section of the tool holder.

23. The tool assembly of claim 21, wherein the first support section of the screwing tool is formed using two conical contact surfaces, each of the two conical contact surfaces having a different angle of taper and wherein the first mounting section of the tool holder is formed using two conical mounting surfaces, each of the two conical mounting surfaces having a different angle of taper.

24. The tool assembly of claim 21, wherein when the screwing tool is engaged within the tool holder, the mounting surfaces shaped as cylindrical segments of the radially inwardly projecting mounting elements of the tool holder are engaged in surface contact with the contact surfaces shaped as cylindrical segments of the radially outwardly projecting supporting elements of the screwing tool.

25. A tool holder configured and arranged for engagement with a screwing tool, the tool holder comprising:

a receiving opening having an internal thread, an internal first mounting section disposed between a front face side of the tool holder and the internal thread and an internal second mounting section following the internal thread, the internal first mounting section, the internal thread, and the internal second mounting section formed as one piece, wherein the internal second mounting section comprises radially inwardly projecting mounting elements that are disposed at a distance from each other, wherein disposed in a circumferential direction between the radially inwardly projecting mounting elements are recesses spaced from the internal thread, the recesses having outside dimensions that are larger than those of the radially inwardly projecting mounting elements.

26. The tool holder of claim 25, wherein the inwardly projecting mounting elements have mounting surfaces shaped as cylindrical segments or have a chambered mounting surface.

27. A tool assembly comprising the tool holder of claim 26 and a screwing tool.

\* \* \* \* \*